(No Model.)
H. H. TRACY.
STEAM CONDENSING AND WATER COOLING APPARATUS.
No. 550,922. Patented Dec. 3, 1895.
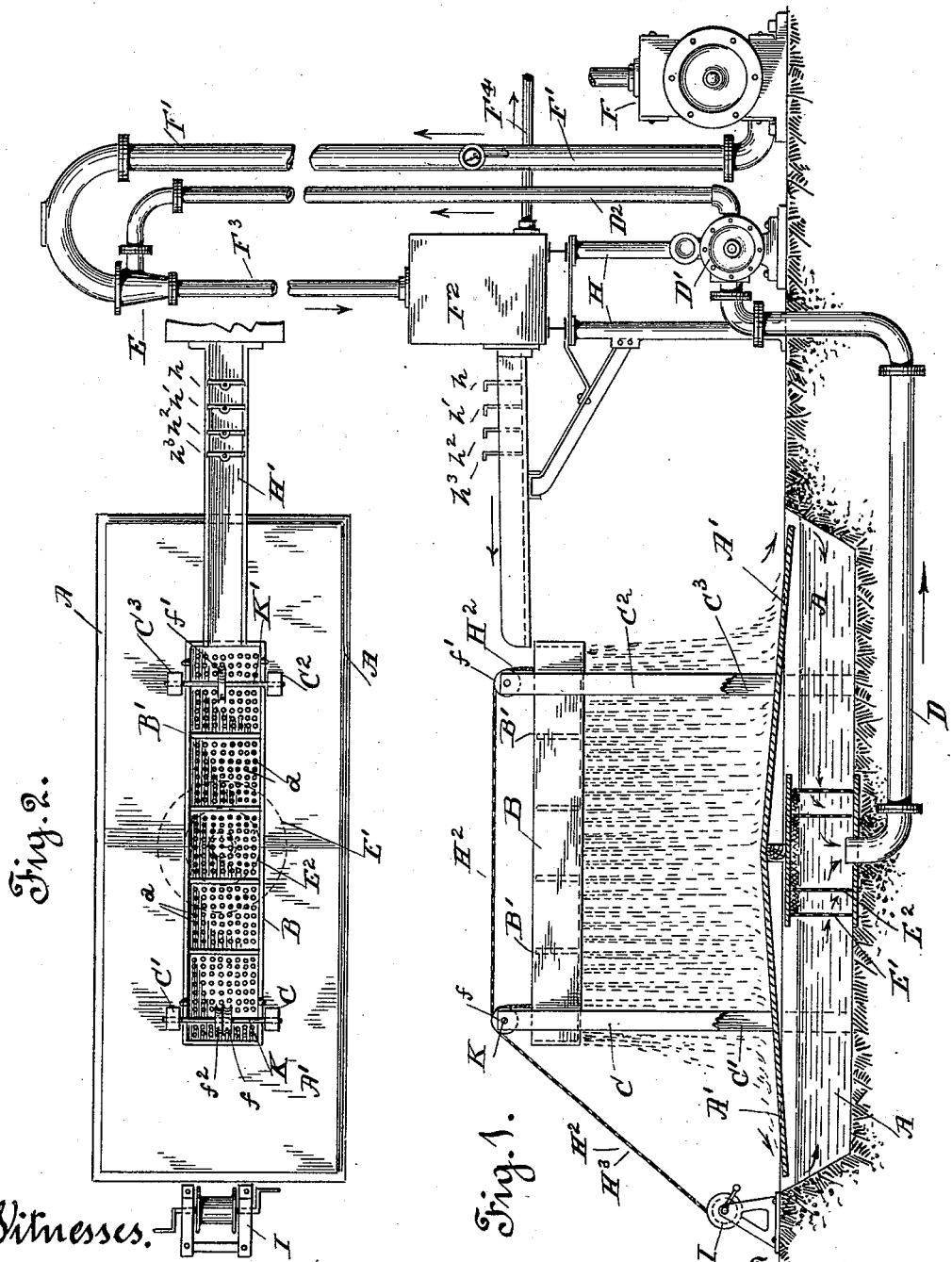

United States Patent Office.

HAYDN HOMER TRACY, OF HOLLISTER, CALIFORNIA.

STEAM-CONDENSING AND WATER-COOLING APPARATUS.

SPECIFICATION forming part of Letters Patent No. 550,922, dated December 3, 1895.

Application filed February 11, 1895. Serial No. 537,902. (No model.)

*To all whom it may concern:*

Be it known that I, HAYDN HOMER TRACY, a citizen of the United States, residing at Hollister, in the county of San Benito and State of California, have invented certain new and useful Improvements in Steam-Condensing and Water-Cooling Apparatus; and I do hereby declare the following to be a full, clear, and exact description of said invention, such as will enable others skilled in the art to which it most nearly appertains to make, use, and practice the same.

The present invention relates to a certain new and useful water cooling and condensing apparatus for steam-engines, which consists in the arrangement of parts and details of construction as will be hereinafter fully set forth and described.

The object of my invention is to provide a simple and economical device for condensing the steam from the exhaust of an engine and cooling the condensing water in order that it may be used again for the condensation of the exhaust-steam.

Referring to the drawings forming a part of this application, Figure 1 is a side view in elevation of the entire apparatus, the water-basin and crown-plate or cover for the basin being shown in section; and Fig. 2 is a top plan view showing the water-basin, crown-plate, distributing-sprinkler, and the trough for conveying the water from the hot well to the sprinkler or distributer.

In the drawings, the letter A is used to indicate the water-basin, of any desired shape, preferably rectangular. Above this basin is secured the crown-plate or cover A', which plate entirely covers the basin, excepting for a slight distance from the edges thereof, thus leaving a passage-way for the water flowing over the crown-plate to enter the basin at the edges thereof.

A distance above the crown-plate is supported the water distributer or sprinkler B, which consists of an open perforated trough, which trough is divided into a series of compartments by means of the bulk-heads B', which are made to slide in and out. These bulk-heads do not extend to the top of the trough. Consequently when one compartment is filled with water the overflow therefrom will fill the next, and so on, until that compartment is reached which takes the last excess of water. The object of subdividing the sprinkler or distributing-trough into a series of compartments is to maintain a constant or uniform head with a varying flow of water from the hot well. For instance, the flow of water from the hot well may only be sufficient to fill, say, the first two compartments of the sprinkler or distributer, leaving the others empty. Again, the flow of water from the hot well may be sufficient to fill three or four of the compartments; but however many compartments may be filled, there will be only one having a partial head, which will be the last one receiving the excess or overflow of water from the previous filled compartment. This water sprinkler or distributer is held between the guide-standards $C$ $C'$ $C^2$ $C^3$.

The water contained within the sprinkler makes its escape therefrom through the perforation $a$, and passes in a finely-subdivided state to the cover or crown-plate A', which plate is set at a gradual incline from its central point, from off which it flows into the basin at the edge thereof. From this basin the water is drawn through the pipe D into the circulating-pump D' and forced by the said pump through the discharge-pipe $D^2$ into the condenser E. The water, however, before flowing from the basin into the pipe D passes through the removable screens $E'$ $E^2$, which screens catch any foreign substance which may be within the basin—such as sticks, leaves, and similar articles. The screen $E'$ is of coarser mesh than the inner screen $E^2$, so such substances as may pass through screen $E'$ will be caught by screen $E^2$.

The exhaust or steam from the engine F passes through the exhaust-pipe F' and is discharged into the condenser E and there mixes with the water from the discharge-pipe $D^2$, by means of which the steam is condensed and the body of condensed steam and water is conveyed from the condenser to the hot well $F^2$ through the drop-leg $F^3$, such feed-water as is required for immediate use being discharged into the boiler through the pipe $F^4$, which leads from the hot well.

In order that I may overcome the necessity of pumping the water from the hot well to the water-sprinkler, I locate the hot well a distance above the ground, so as to be slightly above the level of the said sprinkler. In the present case I have shown the hot well upheld by supports H.

When the hot well is thus raised, the water is conducted from the said well to the sprinkler by means of the open trough H'. This trough is provided with a series of graduated screens $h$ $h'$ $h^2$ $h^3$, each of a different mesh. The coarser screens are placed nearest to the hot well. The screens are made removable, so as to permit of being cleaned, and the object thereof is to catch any dirt or foreign substance which may be contained in the water.

By placing the hot well slightly above the level of the sprinkler the water is permitted to flow into the sprinkler by gravitation. This is an important feature of my invention, inasmuch as by this means I overcome the necessity of using a separate pump for pumping the water from the well to the sprinkler.

Inasmuch as my apparatus for cooling the water is exposed to the atmosphere I have found that the wind, if strong, tends to blow the water as it drops from the sprinkler beyond the walls of the water-basin. In order to overcome this defect I make the sprinkler adjustable, so that I can readily increase or decrease the distance thereof from the crown-plate A'. This I accomplish by supporting the water-sprinkler between the guide-standards by the cables $H^2$ $H^3$. The cable $H^2$ passes over the pulley $f$, secured to the shaft K, which passes through the standards C C', and pulley $f'$, secured to the shaft K', which passes through the standards $C^2$ $C^3$, and is connected to one end of the water-sprinkler. The cable $H^3$ passes over pulley $f^2$, secured to shaft K, and is connected to the opposite end of the sprinkler. The free end of the cables I connect to the winch I, located at any convenient point. In case of strong winds the sprinkler may be easily lowered, so as to be nearer the crown-plate in order that the sprayed water may not be carried beyond the edge of the basin and be lost.

By raising the hot well and dispensing with the pumping of water from the hot well to the sprinkler I cause the circulating-pump to act as a combined circulating and sprinkler pump.

Having thus described my invention, what I claim as new, and desire to secure protection in by Letters Patent, is—

1. In a steam condensing and water cooling apparatus, the combination with the water basin, the crown plate covering the same, the water sprinkler arranged a distance above the crown plate of the water basin, the hot well raised above the level of the water sprinkler, a water connection between the hot well and sprinkler, the circulating pump, connection between the circulating pump and water basin, the condenser, the steam exhaust pipe, the discharge pipe of the pump connected with the condenser and the drop leg for conveying the water from the condenser to the hot well.

2. In a water condensing and cooling apparatus, the combination with the water sprinkler or distributer, the hot well, said well being raised above the level of the water sprinkler and a device forming connection between the hot well and sprinkler whereby the water gravitates from the hot well to the sprinkler.

3. In combination with a water condensing and cooling apparatus, a water basin, a crown plate covering the same and an adjustable water sprinkler or distributer secured above the crown plate.

4. In combination with a water condensing and cooling apparatus, the water basin, a crown plate covering the same, an adjustable water distributer supported above the crown plate, said distributer being divided into compartments by bulkheads, the hot well located above the level of the water distributer and the water connection between the hot well and the water sprinkler.

5. The combination with the water basin, the condenser, the hot well, the water distributer located below the hot well and connected thereto so as to receive its supply of water by gravitation, the steam exhaust connected with the condenser, the water discharge pipe connected therewith and the circulating pump for drawing the water from the basin and supplying the same through the discharge pipe into the condenser, from whence it is conveyed to the water distributer through the hot well by gravity.

6. In a water condensing and cooling apparatus, the combination with a siphon condenser, a hot well which receives the water from the condenser, the water distributer located below the level of the hot well and a water connection between the hot well and water distributer whereby the water will gravitate into the water distributer.

7. In combination with the water distributer, the raised hot well and a connecting trough between the hot well and water distributer, said connecting trough having a series of screens located therein.

8. In combination with the water basin, the crown plate, the water distributer having a perforated bottom and the transverse bulkheads located within the water distributer and dividing the same into a series of compartments.

9. In a steam condensing and water cooling apparatus, the combination with the water basin, a crown plate secured thereover (said crown plate being of less diameter than the basin), the water sprinkler arranged a distance above the water basin, the steam condenser, the hot well connected therewith and the circulating pump connected to the hot well.

In testimony whereof I affix my signature in presence of two witnesses.

HAYDN HOMER TRACY.

Witnesses:
N. A. ACKER,
LEE D. CRAIG.